US007665022B1

(12) United States Patent
Bednarz, Jr.

(10) Patent No.: US 7,665,022 B1
(45) Date of Patent: Feb. 16, 2010

(54) MEDIA MANAGEMENT INTERFACING WITH REFINED DATA STRUCTURES

(75) Inventor: Thomas E. Bednarz, Jr., Natick, MA (US)

(73) Assignee: Adobe Systems Incorporated, San Jose, CA (US)

(*) Notice: Subject to any disclaimer, the term of this patent is extended or adjusted under 35 U.S.C. 154(b) by 545 days.

(21) Appl. No.: 10/897,538

(22) Filed: Jul. 23, 2004

(51) Int. Cl.
*G06F 17/30* (2006.01)
*G06F 3/048* (2006.01)

(52) U.S. Cl. .................. 715/721; 715/731; 707/104.1
(58) Field of Classification Search .................. 386/55; 715/720, 716, 731, 739, 723, 721; 707/104.1; 725/46, 47
See application file for complete search history.

(56) References Cited

U.S. PATENT DOCUMENTS

| | | | |
|---|---|---|---|
| 6,429,879 B1* | 8/2002 | Sturgeon et al. ............. 715/723 |
| 6,763,377 B1* | 7/2004 | Belknap et al. ............. 709/223 |
| 2003/0180032 A1* | 9/2003 | Barde et al. .................. 386/55 |
| 2005/0246745 A1* | 11/2005 | Hirsch et al. ................. 725/74 |

OTHER PUBLICATIONS

Cataldo, Beth. *DVD Authoring Workspace*. IDST 133: DVD Authoring, Spring 2007, [online]. Retrieved from <http://www.bethcataldo.com/dvdworks.htm>. Last update, Jan. 23, 2006. [Retrieved on Mar. 12, 2009]. 4 pages.

*Legacy Windows Client: Legacy graphical client for windows only*, [online]. Retrieved from <http://www.perforce.com/perforce/products/p4win.html>. Last update, Nov. 25, 2008. [Retrieved on Mar. 12, 2009]. 3 pages.

* cited by examiner

*Primary Examiner*—Namitha Pillai
(74) *Attorney, Agent, or Firm*—Fish & Richardson P.C.

(57) ABSTRACT

Method and apparatus, including a computer program product, implementing techniques for displaying visible representations of project objects associated with a media project, the project objects having characteristics; and in response to a user action that identifies at least one of the characteristics, altering the visible representation of at least one of the project objects based on the identified characteristic.

14 Claims, 6 Drawing Sheets

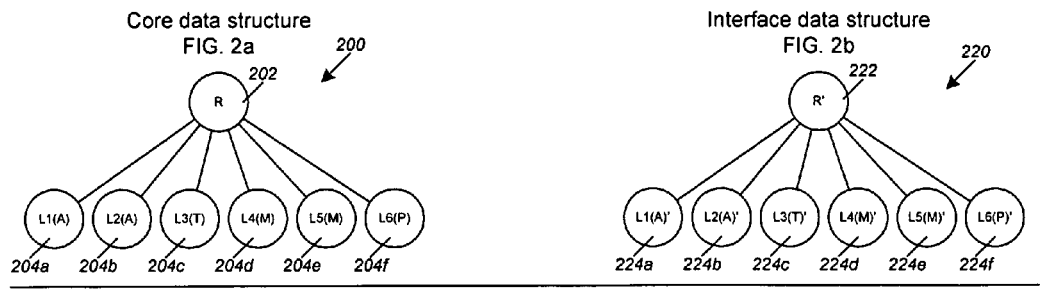
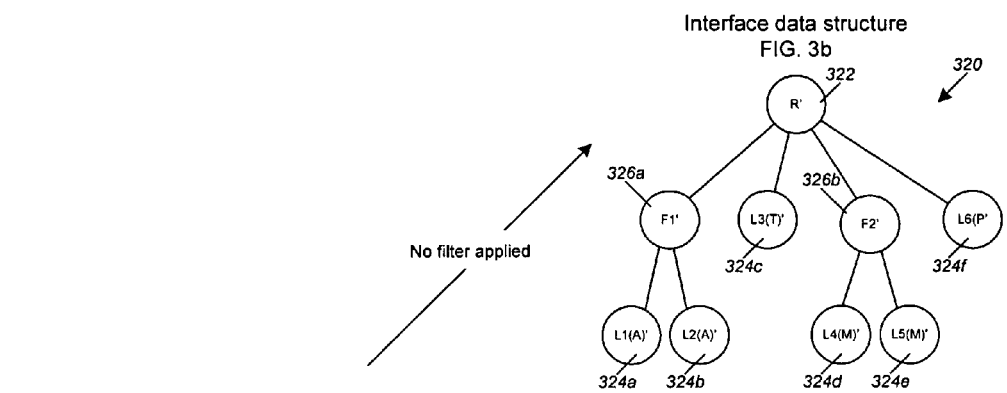
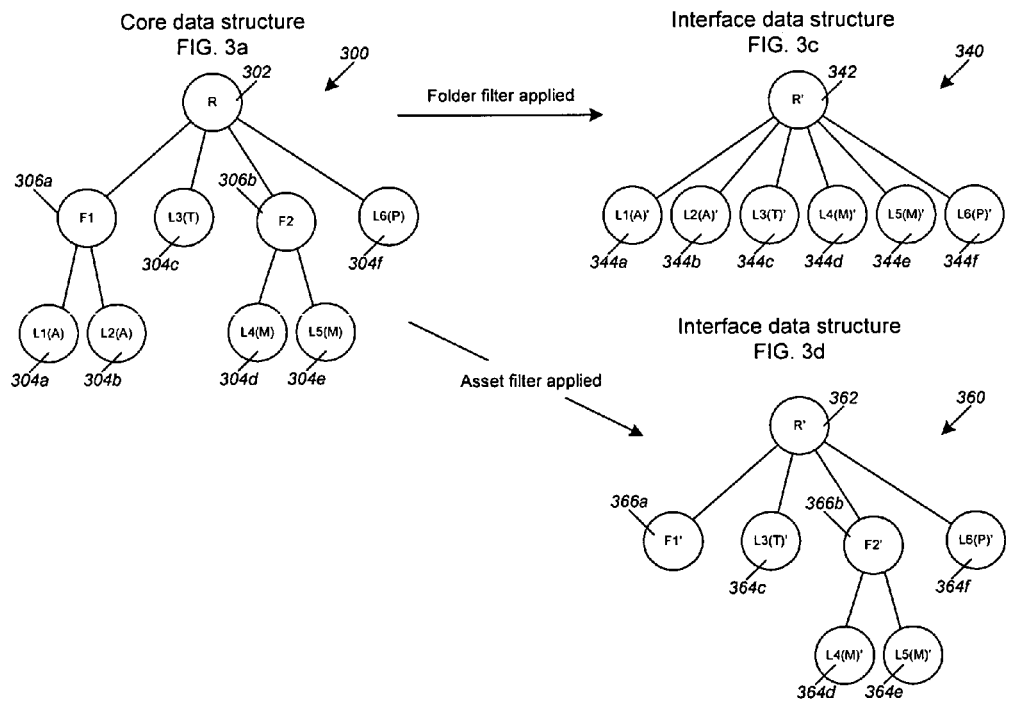

MEDIA MANAGEMENT INTERFACING WITH REFINED DATA STRUCTURES

BACKGROUND

This description relates to media management interfacing.

In some digital versatile disc ("DVD") authoring program interfaces, for example, project objects (e.g., a video file) are organized in a flat data structure or a hierarchical data structure. Icons representing the objects can be moved around in a displayed representation of the data structure. The icons can be grouped into folders, for example, a "Menu" folder and an "Asset" folder. In another example, the user can create a "DVD Features" folder and place the icons of the menu, timeline and asset project objects for a particular DVD feature in the "DVD Features" folder. The folders can be expanded or collapsed, for example, by clicking on an arrow displayed next to the "Menu" folder to hide or display the icons in the "Menu" folder.

SUMMARY

In general, in one aspect, the invention provides a method and apparatus, including a computer program product, implementing techniques for receiving a core data structure associated with a digital media project, the core data structure including a set of project objects for the digital media project, each project object having characteristics; generating an interface data structure based on the core data structure, the interface data structure being a first instance of the core data structure; displaying a first display structure in a graphical user interface (GUI) of a digital media authoring program used to manage the project objects of the digital media project, the first display structure being a graphical representation of the interface data structure; receiving from a user an input action that selects at least one of the project object characteristics; redefining the interface data structure based on the one or more user-selected project object characteristics, the redefined interface data structure being a second instance of the core data structure; and displaying a second display structure in the GUI, the second display structure being a graphical representation of the redefined interface data structure.

The digital media project can be a digital versatile disc (DVD) project and the digital media authoring program can be a DVD authoring program. One of the display structures can be a flat list and the other of the display structures can be a hierarchical tree. The first display structure can include visual representations of the set of project objects for the digital media project, and the second display structure can include visual representations of a proper subset of the project objects for the digital media project. The first display structure can include visual representations of a first proper subset of the project objects for the digital media project, and the second display structure can include visual representations of a second proper subset of the project objects for the digital media project. The first proper subset and the second proper subset can be distinct. The first display structure and the second display structure can include visual representations of project objects. Each visual representation of a project object can be a text icon, a graphical icon, or a thumbnail image.

Each project object can have a category characteristic drawn from a set of categories including an asset category, a timeline category, a menu category, and a playlist category. A project object having the asset category characteristic can be a still image, a sequential image, video, audio, or text.

The techniques can include redefining the interface data structure in response to the user input action selecting at least one project object characteristic. The redefined interface data structure can be a second instance of the core data structure that excludes project objects having the one or more user-selected project object characteristics.

The techniques can include receiving from the user an input action to add a project object to the core data structure; identifying a category characteristic of the project object to be added to the core data structure; and determining whether the category characteristic is one of the one or more user-selected project object characteristics, and if so, taking an action. The techniques for taking an action can include excluding the project object from the core data structure.

In general, in another aspect, the invention provides a method and apparatus, including a computer program product, implementing techniques for displaying visible representations of project objects associated with a media project, the project objects having characteristics; and in response to a user action that identifies at least one of the characteristics, altering the visible representation of at least one of the project objects based on the identified characteristic.

The media project can be a digital versatile disc (DVD) project. A project object having an asset category characteristic can be a still image, a sequential image, video, audio, or text. The project objects can be stored in a core data structure.

The techniques can include displaying the visible representations of the project objects in a flat list or a hierarchy. The techniques can include identifying a category characteristic of a media object to be added to the core data structure; performing a check to determine whether the category characteristic of the media object to be added is one of the one or more user-identified characteristics, and if so, taking an action. The techniques can include displaying the visible representations of the project objects in a display window of a graphical user interface, and altering the visible representations of at least one of the project objects by removing the visible representation of the project object from the display window of the graphical user interface or applying indicia to the visible representation of the project object.

The invention can be implemented to realize one or more of the following advantages. By filtering the project objects stored in the core data structure, a condensed display structure is presented to the user. The user can more easily and efficiently navigate the condensed display structure to locate the project objects he is looking for. Presenting the display structure without project objects of a particular category can be particularly helpful when there are a large number of project objects stored in the core data structure and the user interface can present only a limited amount of data at a time without requiring the user to scroll through the display window. Different views of the core data structure can be provided in the display window. Each of these views is a partial representation of the core data structure that focuses on a particular category of project objects. The data presented for each view can be customized to place emphasis or focus on particular characteristics of the project objects.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIGS. 2a and 3a show core data structures.

FIGS. 2b, 3b, 3c and 3d show interface data structures.

DETAILED DESCRIPTION

Figure 1:
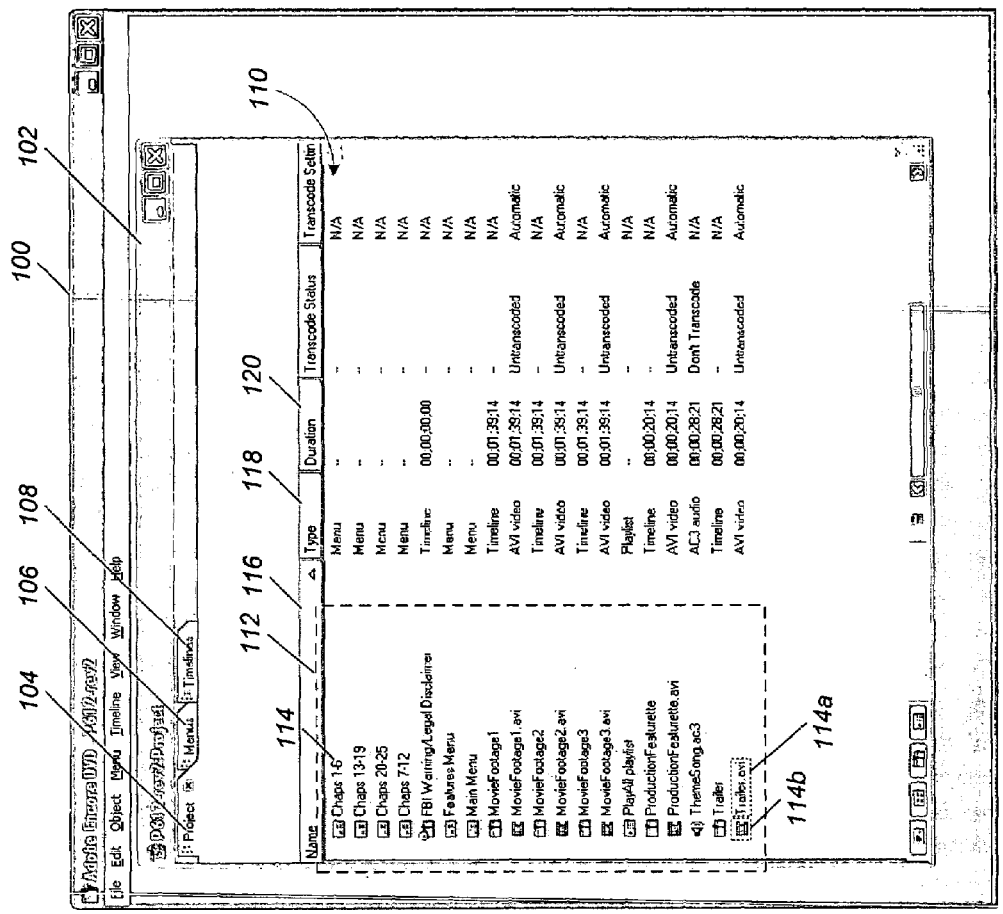
FIG. 1 shows a user interface window.

FIG. 1 shows an implementation of a user interface 100 for managing objects of a media project. The user interface 100 may be part of a digital versatile disc ("DVD") authoring program, such as Adobe® Encore™ DVD 1.5 software available from Adobe Systems Incorporated. A DVD authoring program enables a user to create, organize, and manage objects ("project objects") that are used in a DVD project, e.g., the production of a movie to be recorded on a DVD.

Each project object of a DVD project is associated with a category. Examples of categories include a menu category, a timeline category, an asset category, and a playlist category. In the descriptions to follow, a "menu" refers to a project object associated with the menu category; a "timeline" refers to a project object associated with the timeline category; an "asset" refers to a project object associated with the asset category; and a "playlist" refers to a project object associated with a playlist designation.

Assets can include video clips (e.g., AVI files and MPEG-2 files), audio clips (e.g., AC3 files, WAV files, WMA files, and MP3 files), still images (e.g., GIF files, PSD files, and JPEG files), a series of timed sequential images, and text. Such assets are typically created externally to the DVD authoring program, e.g., by a digital video camcorder recording raw footage of a movie or taping an interview with a cast member, and imported into the DVD project by the user. Some assets form the core content of the DVD, e.g., a video clip of an interview with a cast member, video clips that collectively form the movie itself, and still images of a movie shoot; other assets form the production content of the DVD, e.g., a video clip that forms the background image of the main menu, and an audio clip that forms the background music of the main menu.

When displayed on a television, for example, the menus of a DVD provide a viewer with access to the core content of the DVD. In one example, one main menu item provides a viewer with a direct link to the core content (e.g., a "Play Movie" button on the main menu), and another menu item provides a link to an index or a list of different submenus on the DVD. Submenus provide a viewer with options for setup (e.g., selection of audio, subtitles, and aspect ratio), chapter selection (e.g., selection of specific chapters), and links to core content for special features (e.g., trailer of the movie, and interviews with the cast members).

Menus can be created externally to the DVD authoring program, e.g., by using a digital imaging program such as Adobe® Photoshop® software available from Adobe Systems Incorporated, and imported into the DVD authoring program by the user. Alternatively, menus can be created by the user using a menu editor of the DVD authoring program, e.g., by creating a background (e.g., still image or motion video), adding objects (e.g., text, graphics, thumbnail images or motion video) to the background, converting the objects to selectable buttons, linking each button to an element of the DVD (e.g., another menu or a chapter), and adding background audio.

A timeline is a graphical representation of a portion of the core content of a DVD over a period of time. Each timeline includes an arrangement of assets (e.g., a video clip or a number of still images, one or more audio clips, and optionally, subtitles) that are represented by the timeline. The user can create a timeline using a timeline editor of the DVD authoring program, e.g., by selecting the assets of the timeline, arranging the placement of each asset relative to other assets in the timeline, optionally editing the duration of one or more assets in the timeline, and adding supplemental audio clips or subtitles to the timeline. Each timeline has an end action that can be set by the user to activate another timeline or return a viewer of the DVD to a menu. The sequence of timelines that are linked together by the timeline end actions is referred to as the "natural" play order of the DVD. In a concert DVD project example, the natural play order of the DVD may be configured by the user of the DVD authoring program to interleave a music segment with an interview segment. In other words, the timeline associated with a first music segment has an end action that activates a timeline associated with an interview segment, which itself has an end action that activates a second music segment, and so on.

A playlist is a grouping of timelines that overrides the natural play order of the DVD. In the concert DVD project example, the user can create a "PlayMusic" playlist by grouping the set of timelines associated with the core content of the music portion of the DVD. When a viewer of the DVD activates the "MusicOnly" playlist, e.g., by clicking on a button displayed on a submenu, the music segments are presented in succession, without any interview segments interspersed in between. Similarly, the user can create a "PlayInterviews" playlist that, when activated by a viewer of the DVD, presents the interview segments in succession.

The DVD authoring program stores the project objects of a DVD project in a core data structure of nodes. Each node of the core data structure is associated with a node type, e.g., a root node type, a folder node type, and a file node type. Referring to FIG. 2a, in some implementations, by default, the core data structure 200 is a non-hierarchical flat list that has one non-leaf node ("core root node" 202) associated with the root node type, and one or more leaf nodes ("core leaf node" 204a-204f) associated with the file node type. The core root node 202 of the core data structure 200 represents a DVD project itself; each core leaf node 204a-204f represents a project object of the DVD project, e.g., the core leaf node labeled "L1(A)" 204a represents an asset of the DVD project, the core leaf node labeled "L3(T)" 204c represents a timeline of the DVD project, and so on. Each core leaf node 204a-204f has a sibling relationship (rather than a parent-child relationship) with every other core leaf node 204a-204f in the core data structure 200.

By an arrangement described below, the core data structure 200 can be accessed and displayed to the user of the DVD authoring program through the user interface 100. The example user interface 100 includes a window 102 having several tabs (e.g., "Project" tab 104, "Menus" tab 106, and "Timelines" tab 108) that provide a set of related views, i.e., displaying different aspects of the core data structure 200 in which the project objects of a DVD project are stored.

When the user clicks on the Project tab 104, the user action causes a command to be sent to the DVD authoring program to display a graphical representation of the project objects of the DVD project in a "Project" window 110. The DVD authoring program responds to the command by dynamically updating an interface data structure 220 (FIG. 2b) and updating a graphical representation of the interface data structure ("display structure" 112) that is displayed as content in the "Project" window 110.

The generated interface data structure 220 "mirrors" at least a portion of the core data structure 200 and is an instance of the core data structure 200. Each node of the interface data structure 220 is associated with a node type, e.g., a root node type, a folder node type, and a file node type. In the case in which the core data structure 200 has a flat list arrangement, the interface data structure 220 also has a flat list arrangement. The flat interface data structure 220 has one non-leaf node ("interface root node" 222) associated with the root node type, and one or more leaf nodes ("interface leaf node" 224a-224f) associated with the file node type. The interface root node 222 references the core root node 220; each interface leaf node 224a-224f references a corresponding core leaf node 204a-204f.

The DVD authoring program uses the flat interface data structure 220 to render a corresponding flat display structure 112 in the "Project" window 110. The flat display structure 112 includes visible representations 114 of all of the project objects stored in the core data structure 200 that are referenced by the flat interface data structure 220. In this case, because the interface data structure 220 mirrors the entire core data structure 200, the flat display structure 112 includes visible representations of all of the project object in the DVD project.

A visible representation 114 of a project object may include a text name 114a (e.g., a file name), a graphical icon 114b representing the category to which the project object is associated, and a thumbnail image (not shown). The "Project" tab 104 includes columns (e.g., "Name" 116, "Type" 118 and "Duration" 120) that provide information about each of the project objects having visible representations 114. If the DVD project includes a large number of project objects, the DVD authoring program may display only a portion of the flat display structure 112 in the "Project" window 110; a slider to the right of the "Project" window 110 allows the user to scroll up or down to display other portions of the flat display structure 112.

The user can interact with the user interface 100 to re-define the relationships among the project objects stored in the core data structure 200. For example, the user can select, e.g., by highlighting, the visible representations of project objects displayed in the "Project" window 110 which the user wishes to group in a folder, and select a command which creates a new folder. Referring to FIG. 3a, this user action causes the DVD authoring program to insert a non-leaf node ("core folder node" 306a, 306b) associated with the folder type at a position in the core data structure 300 so that the core leaf nodes containing the user-selected project objects, e.g., core leaf nodes 304a, 304b, have a child relationship respective to the newly-inserted core folder node, e.g., core folder node 306a, and a sibling relationship respective to each other. In so doing, the user modifies the core data structure that organizes the project objects from a flat list 200 (FIG. 2a) having a core root node 202 and core leaf nodes 204a-204f to a hierarchical structure 300 (FIG. 3a) having a core root node 302, core folder nodes 306a-306b, and core leaf nodes 304a-304f.

Information about the changes in the core data structure 300 is conveyed to the interface data structure 220 using change notifications. Each change notification identifies the nature of the change in the core data structure 300, e.g., an addition of a core folder node 306a, 306b, and the nodes in the interface data structure 220 that are affected by the change. The DVD authoring program uses the change notifications to update the interface data structure 220 by adding or deleting nodes from the interface data structure, and/or modifying the positions of one or more nodes of the interface data structure to form a hierarchical interface data structure 320 (FIG. 3b) that is an instance of the core data structure 300. In addition to the interface root node 320 and interface leaf nodes 324a-324f, the hierarchical interface data structure 320 includes one or more non-leaf nodes ("interface folder node" 326a-326b) associated with the folder node type. Each interface folder node 326a, 326b references a respective core folder node 306a, 306b and contains information, e.g., the current filter state, that enables the DVD authoring program to programmatically build its corresponding list of immediate child nodes in response to a program command.

Figure 4A:
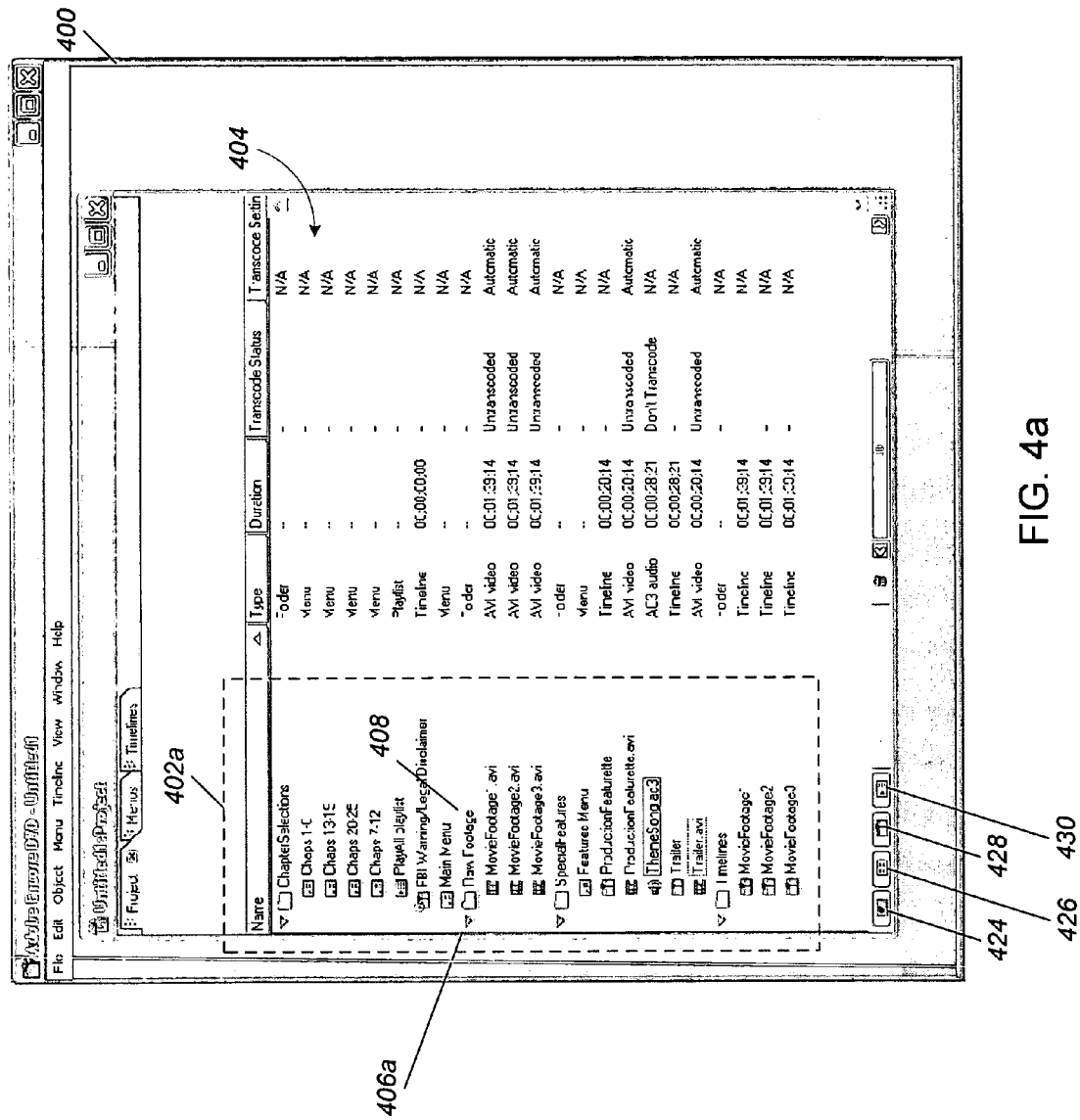
FIGS. 4a-4d show user interface windows.

The DVD authoring program uses the hierarchical interface data structure 320 to render a corresponding hierarchical display structure 402a in the "Project" window 404, as shown in FIG. 4a. The hierarchical display structure 402 provides a visual representation of the relationships among the project objects stored in the hierarchical core data structure 300.

Figure 4B:
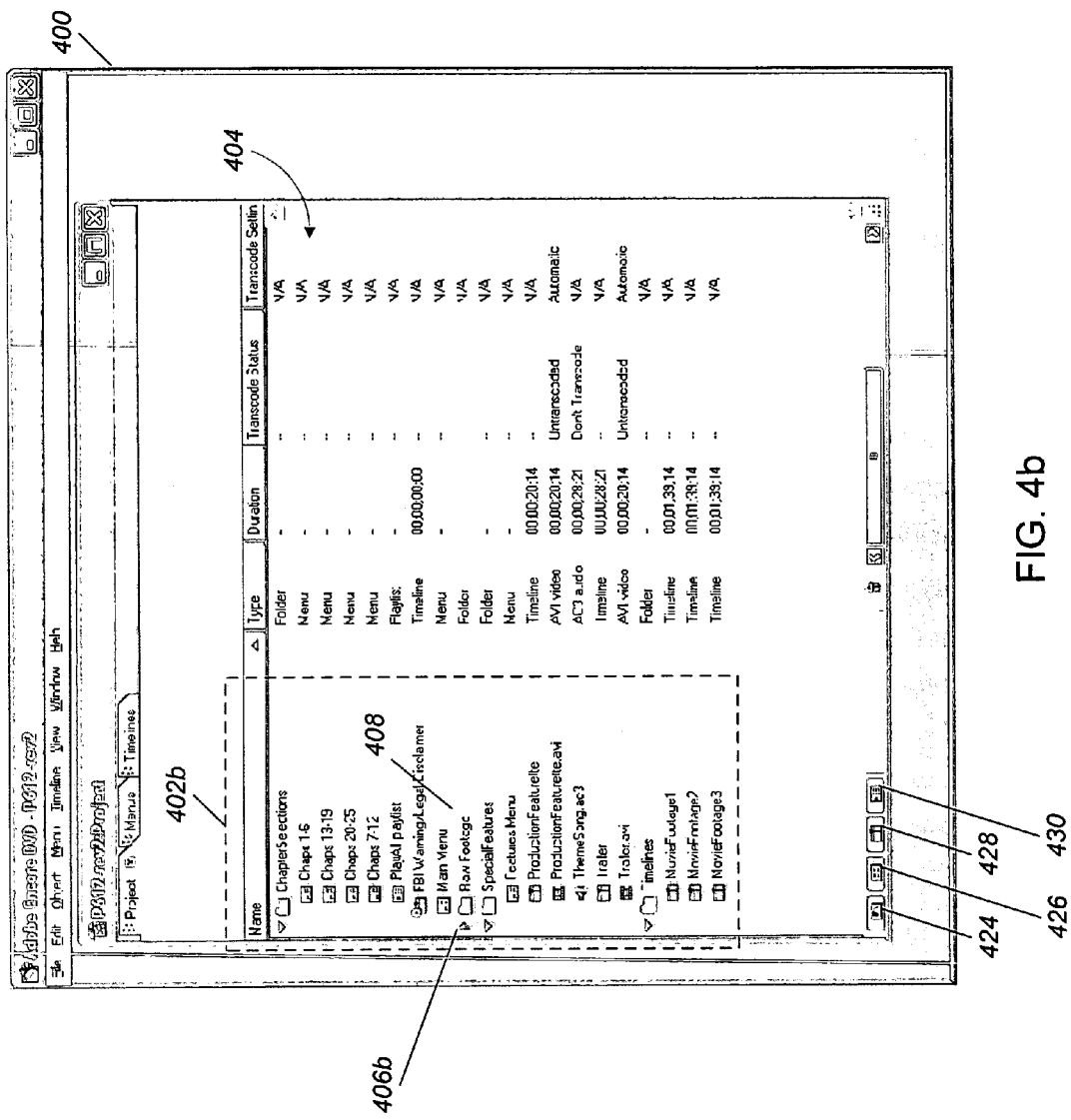

The user can also interact with the user interface 400 to change the appearance of the display structure that is displayed in the Project tab. In the example shown in FIG. 4a, the user can toggle by clicking on a particular folder or a graphical indicator (e.g., "▼" or "▶") next to a folder to expand or collapse the folder. When the "▼" graphical indicator 406a next to the "Raw Footages" folder 408 is toggled, the DVD authoring program executes a program command that instructs an interface folder node referencing the core folder node representing the "Raw Footages" folder 408 to empty its list, and the hierarchical display structure 402b that is subsequently displayed includes only the visible representation of the folder itself, as shown in FIG. 4b. When the "▶" graphical indicator 406b next to the "Raw Footages" folder 408 is toggled, for example, the DVD authoring program executes a program command that instructs an interface folder node referencing the core folder node representing the "Raw Footages" folder 408 to build its corresponding list of immediate child nodes, and subsequently generates a display structure 408a that displays the visible representations of all of the project objects in the "Raw Footages" folder 408 in the "Project" window 404, as shown in FIG. 4a.

If the DVD project has a large number of project objects, the user may have to scroll through a long display structure 402a to locate a particular visible representation of a project object. The user interface 400 can be implemented to include controls that permit the user to apply one or more filters to the core data structure 300, thus altering the visible representation of certain project objects in the display structure 402a. This allows the user to reduce the length of the display structure 402a without removing the project objects from the core data structure 300 or destroying the previously defined relationships among the project objects in the core data structure 300.

In some examples, the user interface 400 includes a control that permits the user to apply a folder filter to the core data structure 300. For example, the user can "right-click" in the "Project" tab of FIG. 4a to display a pull-down menu, and select from the pull-down menu a "Hide Folders" option. This user action causes the DVD authoring program to dynamically update the interface data structure to have a flat list arrangement 340 (FIG. 3c), rather than a hierarchical tree arrangement 320 (FIG. 3b). The updated interface data structure 340 has an interface root node 342 that references the core root node 302 of the hierarchical core data structure 300 (FIG. 3a), and interface leaf nodes 344a-344f that reference corresponding core leaf nodes 304a-304f of the hierarchical core data structure 300 (FIG. 3a). The core folder nodes 306a, 306b of the hierarchical core data structure 300 are not referenced by the flat interface data structure 340. Thus, the structure and content of the interface data structure 320, 340 is dynamically controlled both by the structure and content of the core data structure 300 and by actions of the user.

Figure 4C:
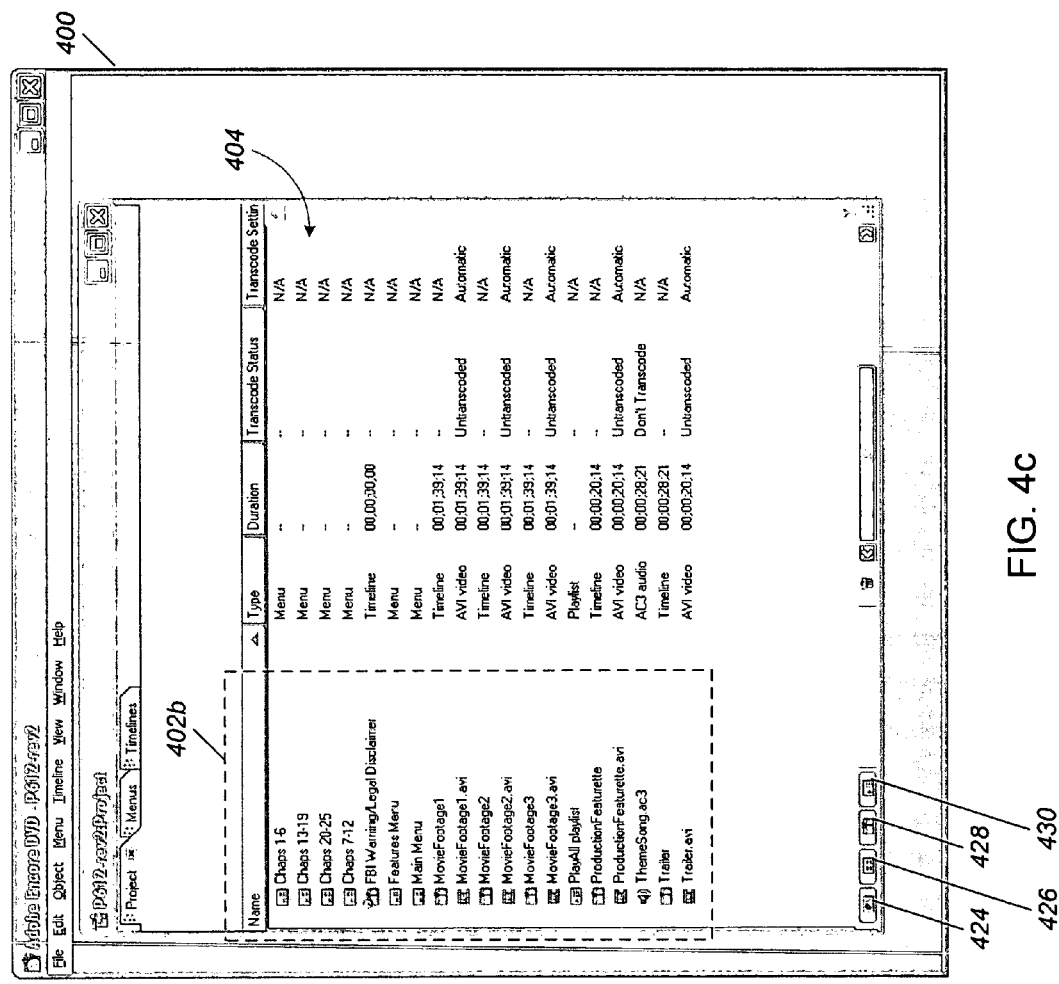

Accordingly, when displayed in the "Project" window 404, the display structure 402c is presented as a flat list rather than a hierarchical tree, as shown in FIG. 4c. To revert to the hierarchical display structure 402a of FIG. 4a, the user can "right-click" in the "Project" window 404 of FIG. 4c to display a pull-down menu, and select from the pull-down menu a "Show Folders" option. In this manner, the user can toggle between the flat display structure 402c and the hierarchical display structure 402a without causing any change, e.g., to the defined relationships between project objects, to be made to the core data structure 300 that organizes the project objects. The "Hide Folders" and "Show Folders" options are available for selection only if the core data structure includes at least one parent-child relationship between two nodes.

The user interface 400 can also include representations of filters, e.g., text icons or graphical icons. In the example of FIG. 4a, toggle buttons, e.g., a "Display Assets" button 424, a "Display Menus" button 426, a "Display Timelines" button 428, and a "Display Playlists" button 430, located along the bottom of the "Project" window 404 allow the user to apply a corresponding filter to the core data structure 300.

For example, when the user "clicks" on the "Display Assets" button 424 to apply the asset filter to the core data structure 300, the DVD authoring program dynamically updates the hierarchical interface data structure 360 such that the interface leaf nodes 364c-364f collectively reference only a subset of the core leaf nodes 304c-304f of the hierarchical core data structure 300, i.e., some of the core leaf nodes are not referenced by the interface leaf nodes, as shown in FIG. 3d. In the case in which the asset filter is being applied to the core data structure 300, none of the core leaf nodes 304a, 304b that represent assets are referenced by the interface leaf nodes 306c-306f of the generated interface data structure 360.

Figure 4D:
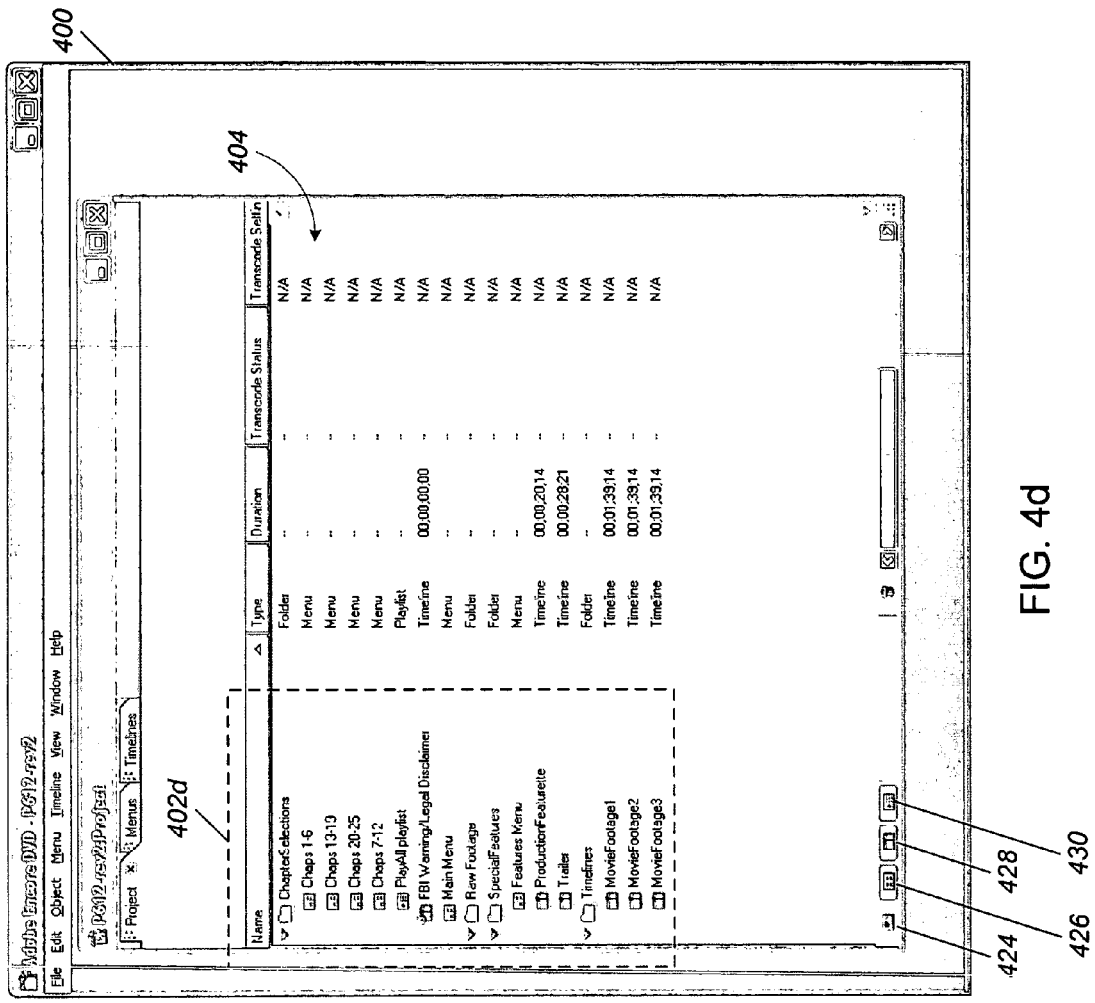

FIG. 4d shows the user interface 400 after the user "clicks" on the "Display Assets" button 424 (FIG. 4a) to apply the asset filter to the core data structure 300 and the hierarchical interface data structure 360 is updated to remove all references to the core leaf nodes 304a, 304b representing assets. As can be seen, the DVD authoring program has removed the visible representations of the assets, for example, the AVI video files, from the hierarchical display structure 402d presented in the "Project" window 404. The visible representations of the non-asset project objects remain displayed in their relative positions in the hierarchical tree display structure. If the user "clicks" on the "Display Assets button" 424 (FIG. 4e) a second time, the DVD authoring program executes a program command that instructs the interface root node and each interface folder node in the interface data structure to re-build its corresponding list of immediate child nodes, thus restoring the interface leaf nodes that reference the core leaf nodes representing assets. When displayed in the Project window 404, the hierarchical display structure 402a includes the visible representations of the assets (FIG. 4a).

Removal of a visible representation of a project object from a "Project" window 404 is one way in which the DVD authoring program causes a project object to have a different visual representation. In other implementations, the DVD authoring program provides an option in which the filtering causes indicia (e.g., a color, tone, hue, sizing, or other visual indicator) to be applied to the visible representations of the project objects associated with a particular category.

If a filter is applied to the core data structure when an attempt is made by the user to import or create a project object, the DVD authoring program performs a check to determine whether the project object to be added to the core data structure is associated with the category that is being filtered. For example, if an asset filter is applied to a core data structure when the user attempts to import an asset, the attempted asset import fails. The DVD authoring program may be implemented to automatically display a dialog box on the user interface that requests the user to indicate whether the user would like to remove the applied asset filter, and if so, whether the user would like to continue with the import. In another example, the asset import is successful, i.e., a node containing the asset is added to the core data structure; however, a visible representation of the asset is not provided in the display structure displayed in the Project tab.

Other tabs (e.g., "Menus" tab 106, and "Timelines" tab 108) provide different views of the core data structure. In one implementation, when the user clicks on the Menus tab 106, the DVD authoring program dynamically updates the interface data structure to include interface leaf nodes that collectively reference all of the core leaf nodes that represent menus. The DVD authoring program then provides a graphical representation of the interface data structure ("display structure") in a Menus window. Similarly, when the user clicks on the Timeline tab 108, a display structure including visible representations of the timelines is presented in a Timelines window.

The DVD authoring program can be implemented to allow a user to customize the user interface by adding user-specified tabs (e.g., a "Playlists" tab) so that other views of the core data structure may be presented. Each user-specified tab is associated with a filter that may be applied to the core data structure. The filter may be predefined by the DVD authoring program and exposed on the user interface in response to a user action. Alternatively, the filter may be defined by the user using an AND logic expression. In one example, the DVD authoring program provides a selection dialog on the user interface that includes a list of all of the filter types that the DVD authoring program recognizes as filter types. Examples of filter types include category-specific types (e.g., a menu type, an asset type, a playlist type, and a timeline type) and user-specified types (e.g., a menu-with-duration type, a timeline-with-no-set-end-action type). In one implementation, each filter type is associated with a check box that can be checked or unchecked by the user to indicate a selection or a non-selection, respectively. Once the user has selected at least two filter types and indicated to the DVD authoring program that the filter selection is complete (e.g., by clicking on a "Finish" button provided in the selection dialog), the DVD authoring program constructs an AND logic expression of filter types using the user-selected filter types. The AND logic expression may be arbitrarily complex. In other words, the AND logic expression is not subject to pre-determined limitations as to length (i.e., the number of filter types) or content (i.e., the combination of filter types).

The invention and all of the functional operations described in this specification can be implemented in digital electronic circuitry, or in computer hardware, firmware, software, or in combinations of them. The invention can be implemented as a computer program product, i.e., a computer program tangibly embodied, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A tangible computer readable medium encoded with software, the medium comprising instructions operable to cause data processing apparatus to:
   receive a core data structure associated with a digital media project being produced, the core data structure including a set of project objects for the digital media project, each project object having characteristics;
   generate an interface data structure based on the core data structure, the interface data structure being a first instance of the core data structure and including a non-hierarchical structure;
   display a first display structure in a graphical user interface (GUI) of a digital media authoring program used to manage the project objects of the digital media project being produced, the first display structure being a graphical representation of the interface data structure;
   receive from a user an input action that selects at least one of the project object characteristics;
   redefine the interface data structure based on the one or more user-selected project object characteristics, the redefined interface data structure being a second instance of the core data structure and including a hierarchical structure;
   display a second display structure in the GUI, the second display structure being a graphical representation of the redefined interface data structures;
   receive from the user an input action to add a project object to the core data structure;
   identify a category characteristic of the project object to be added to the core data structure; and
   determine whether the category characteristic is one of the one or more user-selected project object characteristics, and if so, take an action.

2. The medium of claim 1, wherein the digital media project is a digital versatile disc (DVD) project and the digital media authoring program is a DVD authoring program.

3. The medium of claim 1, wherein one of the display structures is a flat list and the other of the display structures is a hierarchical tree.

4. The medium of claim 1, wherein:
   the first display structure includes visual representations of the set of project objects for the digital media project; and
   the second display structure includes visual representations of a proper subset of the project objects for the digital media project.

5. The medium of claim 1, wherein:
   the first display structure includes visual representations of a first proper subset of the project objects for the digital media project; and
   the second display structure includes visual representations of a second proper subset of the project objects for the digital media project.

6. The medium of claim 5, wherein the first proper subset and the second proper subset are distinct.

7. The medium of claim 1, wherein each project object has a category characteristic drawn from a set of categories comprising an asset category, a timeline category, a menu category, and a playlist category.

8. The medium of claim 7, wherein a project object having the asset category characteristic comprises a still image, a sequential image, video, audio, or text.

9. The medium of claim 1, further comprising instructions to:
   in response to the user input action selecting at least one project object characteristic, redefine the interface data structure so that the second instance of the core data structure excludes project objects having the one or more user-selected project object characteristics.

10. The medium of claim 1, wherein the instructions to take an action comprise instructions to:
    exclude the project object from the core data structure.

11. The medium of claim 1, wherein the first display structure and the second display structure include visual representations of project objects, each visual representation of a project object comprising a text icon, a graphical icon, or a thumbnail image.

12. A method comprising:

receiving a core data structure associated with a digital media project being produced, the core data structure including a set of project objects for the digital media project, each project object having characteristics;

generating an interface data structure based on the core data structure, the interface data structure being a first instance of the core data structure and including a non-hierarchical structure;

displaying a first display structure in a graphical user interface (GUI) of a digital media authoring program used to manage the project objects of the digital media project being produced, the first display structure being a graphical representation of the interface data structure;

receiving from a user an input action that selects at least one of the project object characteristics;

redefining the interface data structure based on the one or more user-selected project object characteristics, the redefined interface data structure being a second instance of the core data structure and including a hierarchical structure;

displaying a second display structure in the GUI, the second display structure being a graphical representation of the redefined interface data structure;

receiving from the user an input action to add a project object to the core data structure;

identifying a category characteristic of the project object to be added to the core data structure; and determining whether the category characteristic is one of the one or more user-selected project object characteristics, and if so, take an action.

13. The method of claim 12, wherein the digital media project is a digital versatile disc (DVD) project and the digital media authoring program is a DVD authoring program.

14. The method of claim 12, further comprising:

in response to the user input action selecting at least one project object characteristic, redefining the interface data structure so that the second instance of the core data structure excludes project objects having the one or more user-selected project object characteristics.

\* \* \* \* \*

UNITED STATES PATENT AND TRADEMARK OFFICE
CERTIFICATE OF CORRECTION

| | | |
|---|---|---|
| PATENT NO. | : 7,665,022 B1 | Page 1 of 1 |
| APPLICATION NO. | : 10/897538 | |
| DATED | : February 16, 2010 | |
| INVENTOR(S) | : Thomas E. Bednarz, Jr. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 765 days.

Signed and Sealed this

Seventh Day of December, 2010

David J. Kappos
*Director of the United States Patent and Trademark Office*